US009788561B2

(12) United States Patent
van der Hijden et al.

(10) Patent No.: US 9,788,561 B2
(45) Date of Patent: Oct. 17, 2017

(54) TOMATO FIBRE COMPOSITION AND METHOD FOR THE PREPARATION THEREOF

(71) Applicant: Conopco, Inc., Englewood Cliffs, NJ (US)

(72) Inventors: Hendrikus Theodorus W M van der Hijden, Hoek van Holland (NL); Michael Jacobus Suijker, Schiedam (NL); Harmannus Tammes, Schiedam (NL)

(73) Assignee: Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 14/650,982

(22) PCT Filed: Dec. 3, 2013

(86) PCT No.: PCT/EP2013/075359
§ 371 (c)(1),
(2) Date: Jun. 10, 2015

(87) PCT Pub. No.: WO2014/095342
PCT Pub. Date: Jun. 26, 2014

(65) Prior Publication Data
US 2015/0335054 A1 Nov. 26, 2015

(30) Foreign Application Priority Data

Dec. 20, 2012 (EP) ..................... 12198622

(51) Int. Cl.
| | |
|---|---|
| *A23L 1/0534* | (2006.01) |
| *A23L 1/308* | (2006.01) |
| *A23L 29/231* | (2016.01) |
| *A23L 29/262* | (2016.01) |
| *A23L 19/00* | (2016.01) |
| *A23L 33/22* | (2016.01) |
| *A23L 33/24* | (2016.01) |

(52) U.S. Cl.
CPC ............. *A23L 1/3081* (2013.01); *A23L 19/09* (2016.08); *A23L 29/231* (2016.08); *A23L 29/262* (2016.08); *A23L 33/22* (2016.08); *A23L 33/24* (2016.08); *A23V 2002/00* (2013.01)

(58) Field of Classification Search
CPC .... A23L 1/3081; A23L 1/3082; A23L 1/2128; A23V 2002/00
USPC .......... 426/577, 615, 481, 495, 520
See application file for complete search history.

(56) References Cited

U.S. PATENT DOCUMENTS

| | | |
|---|---|---|
| 7,166,315 B2 | 1/2007 | Hartal |
| 7,635,496 B2 | 12/2009 | Romeo |
| 2003/0224100 A1 | 12/2003 | de la Cuadra |

FOREIGN PATENT DOCUMENTS

| | | |
|---|---|---|
| CA | 2174056 | 5/1997 |
| CN | 1463623 | 2/2005 |
| CN | 101164427 | 4/2008 |
| PT | 101610 | 5/1999 |
| WO | WO9516363 | 6/1995 |
| WO | WO9748287 | 12/1997 |
| WO | WO0221935 | 3/2002 |
| WO | WO03051138 | 6/2003 |
| WO | WO03101223 | 12/2003 |
| WO | WO2005074714 | 8/2005 |
| WO | WO2008148828 | 12/2008 |
| WO | WO2009077970 | 6/2009 |
| WO | WO2011138163 | 11/2011 |
| WO | WO2011138579 | 11/2011 |

OTHER PUBLICATIONS

Blumenkrantz et al., "New Method for Quantitative Determination of Uronic Acids", Analytical Biochemistry, vol. 54, 1973 pp. 484-489. pp. 1 to 6.
Farahnaky et al., "The use of tomato pulp powder as an thickening agent in the formulation of tomato ketchup", Journal of Texture Studies, Dec. 2008, vol. 39 No. 2, pp. 169-182; XP002605852 . pp. 7 to 20.
Foster et al., "Natural structuring with cell wall materials", Elsevier BV, May 24, 2011, vol. 25, No. 8, pp. 1828-1832. pp. 21 to 25.
Giovanelli, "Water sorption, drying and antioxidant properties of dried tomato products", Journal of Food Engineering vol. 52 2002 pp. 135-141. pp. 26 to 32.
Hilz et al., "A comparison of liquid chromatography, capillary electrophoresis, and mass spectrometry methods to determine xyloglucan structures in black currants", Journal of Chromatography A, vol. 1133, 2006, pp. 275-286. pp. 33 to 44.
Luh et al., "Dietary fibre cellulose and pectin retention in canned tomato juice", IFIS, 1991, vol. 58 No. 10. pp. 1 to 1.
Luh et al., "Pectins and fibres in processing tomatoes", IFIS, 1985. pp. 2 to 2.
Redgwell et al., "Physicochemical properties of cell wall materials from apple, kiwifruit and tomato", European Food Research and Technology, Oct. 10, 2007, vol. 227, No. 2, pp. 607-618. pp. 3 to 14.

(Continued)

*Primary Examiner* — Helen F Heggestad
(74) *Attorney, Agent, or Firm* — Greenberg Traurig, LLP

(57) ABSTRACT

One aspect of the invention relates to tomato fiber composition having a dry matter content of at least 1 wt. %, wherein at least 80 wt. % of said dry matter is water-insoluble, said fiber composition comprising, by weight of dry matter: 15-50% cellulose; 5-45% pectin; 0-10% of monosaccharides, said monosaccharides being selected from fructose, glucose and combinations thereof; and 0.003-1% lycopene; wherein the fiber composition contains less than 60% pectin by weight of cellulose. The tomato fiber composition of the present invention has excellent water structuring properties. Another aspect of the invention relates to a method of manufacturing a product selected from a foodstuff, a beverage and a nutritional formulation, said method comprising incorporating into said product the aforementioned tomato fiber composition. The invention further provides a process of manufacturing a tomato fiber composition.

15 Claims, No Drawings

(56) References Cited

OTHER PUBLICATIONS

Saeman et al., "Quantitative Saccharification of Wood and Cellulose", Industrial and Engineering Chemistry, vol. 17, No. 1, 1945, pp. 35-37. pp. 15 to 17.
Sanchez et al., "Rheological Properties of Tomato Paste: Influence of the Addition of Tomato Slurry", Food Engineering and Physical Properties, vol. 68, No. 2, 2003 pp. 551-554. pp. 18 to 21.
Updegraff et al., "Semimicro Determination of Cellulose in Bilogical Materials", Analytical Biochemistry, vol. 32, 1969, pp. 420-424. pp. 22 to 26.
Search Report in EP12198622 dated Mar. 22, 2013. pp. 1 to 3.
Search Report in PCT/EP2013/075359 dated Mar. 12, 2013. pp. 4 to 7.
Written Opinion in EP121987622 dated Mar. 22, 2013. pp. 8 to 8.
Written Opinion in PCT/EP2013/075359 dated Mar. 12, 2013. pp. 9 to 14.

TOMATO FIBRE COMPOSITION AND METHOD FOR THE PREPARATION THEREOF

FIELD OF THE INVENTION

The present invention relates to a tomato-derived fibre composition and to the use of such composition in, for instance, food products and beverages. The tomato fibre composition of the present invention has excellent water structuring properties and can suitably be used as a thickening agent.

The invention also provides a process for the preparation of the aforementioned tomato fibre composition.

BACKGROUND OF THE INVENTION

Tomato-based products such as tomato ketchups, barbecue sauces, pizza and pasta sauces and other similar condiments are typically made from tomato pastes, tomato purees, tomato juices or similar compositions that contain substantial amounts of tomato solids. These tomato solids include water-insoluble tomato particles, including tomato seeds and portions of tomato skins; and tomato fibres (cellulose, hemicellulose, pectin) which comprise the bulk of the insoluble tomato solids. Each of these components affects the stability, appearance, flavour and sensory appeal of tomato-based food products.

For example, the carotene lycopene that gives tomato sauce its characteristic red colour is found primarily in chromoplasts within the tomato pulp and tomato fibre. Hence, the amount and distribution of the pulp and fibre will determine whether the tomato sauce will have an overall, even desirable colour. In addition, the size and distribution of the tomato pulp particles may also affect the texture of such tomato-based products. Large, unevenly distributed pulp particles will tend to produce a lumpy product, while extremely finely divided pulp particles will tend to produce a smooth textured product.

Similarly, the tomato fibres tend to link together and intertwine to form a lattice network or fibrous matrix that provides body and viscosity to tomato-based products and further traps free liquid which would otherwise "weep", i.e. separate, from the product. The liquid typically consists primarily of water and may also include other tomato fluids, and additives to the product. When present in sufficient concentrations, the pectin in tomato-based products forms a gel that also acts to bind free liquid in the products and to increase the products' viscosity.

It is known to modify the physical properties of the tomato solids in tomato sauces and slurries using various techniques, including homogenisation of the products. Homogenisation is employed to finely divide, break down and disperse pulp particles throughout a slurry to produce products with acceptable colour and texture. Tomato pulp contributes many relatively spherical particles, which are insoluble in water and which must be reduced in size and uniformly dispersed throughout the product. If this is not done, a product with an excessively rough texture will result. Furthermore, since the carotene pigment (lycopene) is contained in these particles of pulp and fibre, failure to properly disperse them will result in a product with poor uniformity and depth of colour.

In addition to the above particles, tomato dispersions have a very high content of fibrous strands. Through proper processing techniques, these fibres form a structure that is responsible for the viscosity of the product and for its ability to bind water. Homogenisation can be used to enhance the water binding capacity of the fibrous strands. This enhanced water binding capacity is usually reflected by increased product viscosity and/or reduced syneresis.

However, the process does have limitations. If too high a homogenizing pressure is used, then the fibre network will be broken down. Although the greater number of individual fibres will absorb more water and cause a greater viscosity increase, any remaining free water will quickly separate because the structure which bound this water will have been destroyed. In short, the price for greater viscosity is an increase in serum separation. In practice, processing conditions are chosen on the basis of a compromise between these two opposing effects. A component that plays an important role in the preparation of tomato dispersions is pectin. This naturally occurring polysaccharide increases product viscosity and reduces separation by tying up any remaining free water. Homogenization increases both of these effects by aiding in the enhanced and uniform solubilisation of the pectin.

Obviously, the preparation of tomato products is very much subject to variations in the structure and chemistry of the tomatoes used. This, in turn, is dependent upon such growing factors as: geographical location, climate conditions, weather variations, soil conditions, growing season and variety of tomato. There is no way to eliminate the influence of such factors. However, adjustments in homogenising conditions may be required to compensate for unwanted characteristics in the final product resulting from these factors. This type of precise control over the physical characteristics of the finished product is very important in maintaining a degree of consistency from batch to batch.

Alternative processing steps have been used to supplement the effects of homogenisation, including the additional steps of milling the products or using of vacuum expansion chambers to increase viscosity and improve the colour of the products.

Despite the efforts that have been made to optimise the stability, appearance, flavour and sensory appeal of tomato-based food products by manipulating the processing conditions that are employed in the manufacture of these products, it is common practice to employ additives, notably calcium chloride and/or viscosifiers, to further improve stability and texture of tomato-based products. In the tomato processing industry calcium chloride is frequently added to tomato products to increase their viscosity and to prevent syneresis. The calcium ions react with free carboxyl groups of tomato pectin to produce a gel network of calcium pectate.

Viscosifiers such a natural gums, starch, pectin, guar gum, xanthan gum and CMC are also widely used to increase the viscosity of and/or to prevent syneresis in tomato-based products such as ketchup. From a consumer perspective, the use of such additives in tomato products, notably the use of additives that are foreign to tomatoes, is undesirable.

Farahnakyi et al., Journal of Texture Studies, vol. 39. (2007), pp. 169-182 describe a method for preparing a thickening agent, involving drying tomato waste ("pomace", mainly including tomato seeds and skins) to a moisture content of about 7%, followed by milling and sieving. This results in a tomato pomace tomato fibre powder comprising (on dry matter) 24.8 wt % protein, 0.08 wt % lycopene, 13.8/14.5 wt % reducing sugars/total sugars and 41.1 wt % fibers.

U.S. Pat. No. 7,166,315 describes a composition comprising dietary fibres with high water holding capacity (WHC) that is obtained from tomato pulp. The composition can be used as a texturing, bulking, viscosity controlling or syneresis-preventing agent for food. The US patent further describes a process for preparing the aforementioned composition comprising:
1) pre-treating tomatoes by conventional unit operations which comprise washing, sorting and crushing,
2) separating the peel and seeds of the tomato from the crushed tomatoes,
3) subjecting the crushed tomatoes to heat treatment (80-110° C.),
4) separating the crushed tomatoes into serum and pulp by centrifugation, to obtain fine pulp,
5) extracting carotenoids and lipids from the fine pulp obtained in step 4, and
6) drying the extracted fine pulp obtained in step 5;
and wherein the peels and seeds of the tomato are separated from the crushed tomatoes at any stage before said extracting and drying. Following the separation stage, carotenoids and lipids are extracted from the fine pulp to obtain, after solvent removal, tomato fibres substantially free of lipids, carotenoids, seeds and peels The solvent may then be removed by azeotropic distillation.

WO 2011/138163 describes a process for preparing a tomato-derived thickening agent comprising the steps of:
a) providing a tomato pulp containing 3-15 wt. % tomato soluble solids (TSS) and 0.3-5 wt. % tomato insoluble solids (TIS);
b) isolating from said tomato pulp a tomato serum fraction having a reduced TIS content of less than 2.0 wt. % and a TSS content of at least 3 wt. %;
c) subjecting said tomato serum fraction to a filtration step to produce a retentate and a filtrate, said filtration step employing a membrane with a molecular weight cut-off (MWCO) in the range of 10-20,000 kDa;
d) collecting the retentate; and
e) optionally drying the retentate.

WO2008/148828 describes the isolation of a gel building material from tomato. 6.9 kg Red Matrix tomatoes were soaked for 60 seconds in boiling water. Skin, seeds and coarse were removed thereafter by hand. 4.4 kg fruit flesh were obtained. This flesh was homogenized in a kitchen blender and thereafter heat treated at 80° C. for 10 minutes. The homogenized flesh was cooled down to room temperature by the application of cool water and afterwards centrifuged at 5000 rpm (7268 g) for 10 minutes. The supernatant was discarded and the remaining cellular material was washed with 500 ml water. The resulting slurry was centrifuged again at 5000 rpm (7268 g) for 10 minutes. This washing step including the subsequent centrifugation was carried out in total 3 times.

The obtained cellular material was split into two fractions in a ratio of 2:1. ⅔ of the obtained cellular material was washed with 500 ml acetone p. a. followed by a centrifugation step at 5000 rpm (7268 g) for 10 minutes. This washing procedure in acetone as organic solvent was in total repeated three times. The obtained washed cellular material was then passed through a Buchner funnel equipped with a GF/A filter and again washed with more acetone as organic solvent. Afterwards the cellular material was dried under a fume hood to obtain 20.5 g CMW from Red Matrix tomatoes. The remaining ⅓ of the cellular material obtained after washing with water was subjected to the exact same treatment as described above, however with the difference, that ethanol (94%) was used instead of acetone. 10.7 g CMW from Red Matrix tomatoes were obtained.

Redgwell et al. (*Physicochemical properties of cell wall materials from apple, kiwifruit and tomato*, Eur Food Res Technol (2008) 227:607-618) describe a method of isolating cell wall materials (CWMs) from the fruit of ripe apple, kiwifruit and tomato which according to the authors maximised the water retaining capacity and viscosity generating properties of the CWMs. In this method fruit were peeled and the pericarp separated from the seeds and other tissues (i.e. core and locule tissue in kiwifruit and the locule tissue in tomato). Tissue was homogenised in a Waring blender with a little added water. The tissue homogenate was heated at 80° C. for 10 min to inactivate endogenous enzymes, cooled, centrifuged at 5,000 g for 10 min and the supernatant discarded. The residue (CWM) was re-suspended in 600 ml of water, centrifuged and the supernatant discarded. The water-wash of the CWM was repeated twice. CWM was resuspended in 600 ml acetone, centrifuged as before and the acetone supernatant discarded. CWM was resuspended in acetone a second time and filtered through glass fibre paper (GF/A). The cake of CWM was rinsed with further acetone on the filter, sucked dry and allowed to air-dry in a fume hood overnight.

SUMMARY OF THE INVENTION

The inventors have found that a tomato fibre composition having excellent water structuring properties can be produced by subjecting a composition containing largely intact tomato cell walls to severe heat treatment (e.g. 30 minutes at 100° C.) and by extensively washing the heated composition so as to remove the bulk of the water soluble components contained therein. Thus, a tomato fibre composition is obtained that contains a substantial amount of water-insoluble tomato fibres and a very limited amount of water-soluble components, such as fructose and glucose. This tomato fibre composition also contains some lycopene.

The heat treatment employed in the preparation of the tomato fibre composition causes a large fraction of the pectin that is bound in the tomato cell walls (as part of the insoluble tomato fibres) to become solubilised. During the subsequent washing this solubilised pectin is removed, resulting in a tomato fibre composition with a strongly reduced pectin/cellulose ratio. Tomatoes normally contain substantially more cellulose than pectin.

Accordingly, one aspect of the invention relates to tomato fibre composition having a dry matter content of at least 1 wt. %, wherein at least 80 wt. % of said dry matter is water-insoluble, said fibre composition comprising, by weight of dry matter:
  15-50% cellulose;
  5-45% pectin;
  0-10% of monosaccharides, said monosaccharides being selected from fructose, glucose and combinations thereof; and
  0.003-1% lycopene;
wherein the fibre composition contains less than 60% pectin by weight of cellulose.

Another aspect of the invention relates to a method of manufacturing a product selected from a foodstuff, a beverage and a nutritional formulation, said method comprising incorporating into said product the aforementioned tomato fibre composition.

The invention further provides a process of manufacturing a tomato fibre composition, said process comprising the successive steps of:
a) heating an aqueous composition comprising 10-100 wt. % of a tomato component selected from tomatoes, mashed tomatoes, tomato juice, tomato puree, tomato paste, tomato precipitate, tomato pomace, tomato skin and combinations thereof to a temperature 'T' exceeding Tmin of 70° C. during a time period T wherein temperature T (in ° C.) and the time period t (in minutes) meet the following equation: $t>1200/(T-69)^{1.4}$; and b) washing the heated aqueous composition or a fraction of the heated aqueous composition with water to reduce the concentration of monosaccharides to less than 10% by weight of dry matter, said monosaccharides being selected from glucose, fructose and combinations thereof.

Although the inventors do not wish to be bound by theory, it is believed that the severe heat treatment employed in the preparation of the tomato fibre composition of the present invention allows the tomato cell walls to swell dramatically during the subsequent washing. In the course of this swelling the cell walls 'delaminate' and insoluble fibres become disentangled. Due to this delamination the insoluble fibres contained in the tomato cell walls can bind more water and can be more easily dispersed in aqueous environment, e.g. by applying moderate shear. Since the insoluble fibres contained in the present tomato fibre composition are largely disentangled, the tomato fibre composition is capable of imparting significant water structuring even when employed in low concentrations.

DETAILED DESCRIPTION OF THE INVENTION

A first aspect of the present invention relates to a tomato fibre composition having a dry matter content of at least 1 wt. %, wherein at least 80 wt. % of said dry matter is water-insoluble, said fibre composition comprising, by weight of dry matter:

15-50% cellulose;
5-45% pectin;
0-10% of monosaccharides, said monosaccharides being selected from fructose, glucose and combinations thereof;
0.003-1% lycopene;
wherein the fibre composition contains less than 60% pectin by weight of cellulose.

The term "fibre" as used herein refers to fibrous polysaccharides such as cellulose, hemi-cellulose and pectin.

In order to determine how much of the dry matter that is contained in a tomato fibre composition is water-insoluble, such a composition is diluted with water (20° C.) to a dry matter content of 1 wt. % and is subsequently centrifuged at 4000 g for 30 minutes. The (dry) pellet material so obtained is considered to be water-insoluble.

The term "pectin" as used herein refers to polysaccharides that are rich in galacturonic acid, including:

Homogalacturonans: linear chains of α-(1-4)-linked D-galacturonic acid;
Substituted galacturonans: containing saccharide appendant residues (such as D-xylose or D-apiose in the respective cases of xylogalacturonan and apiogalacturonan) branching from a backbone of D-galacturonic acid residues;
Rhamnogalacturonan I pectins: containing a backbone of the repeating disaccharide: 4)-α-D-galacturonic acid-(1,2)-α-L-rhamnose-(1. From many of the rhamnose residues, sidechains of various neutral sugars branch off. The neutral sugars are mainly D-galactose, L-arabinose and D-xylose, with the types and proportions of neutral sugars varying with the origin of pectin
Rhamnogalacturonan II: a highly branched polysaccharide. Rhamnogalacturonan II is classified by some authors within the group of substituted galacturonans since the rhamnogalacturonan II backbone is made exclusively of D-galacturonic acid units.

The term "bound pectin" as used herein refers to the pectin that is part of the water-insoluble dry matter that is contained in the tomato fibre composition.

The term "lipids" as used herein refers to hydrophobic tomato compounds, including acylglyerols, phospholipids, carotenoids and sterols like cholesterol.

The term "tomato precipitate" as used herein refers to the solid residue that can be separated from e.g. tomato juice, tomato puree or tomato paste by centrifugation.

The dry matter content of the present fibre composition may range from 1 to 100 wt. %. Preferably, the tomato fibre composition has a dry matter content of 1.5-12 wt. %, more preferably of 3-8 wt. %, and most preferably of 4-6 wt. %.

The water content of the tomato fibre composition preferably lies in the range of 88-99 wt. %, more preferably in the range of 92-97 wt. % and most preferably of 94-96 wt. %.

According to another preferred embodiment, at least 80 wt. %, more preferably at least 90 wt. % and most preferably at least 95 wt. % of the dry matter contained in the present composition is water-insoluble. The dry matter contained in the fibre composition may include a small amount of water soluble material. The dry matter of the fibre composition typically contains not more than 10 wt. %, more preferably not more than 5 wt. % and most preferably not more than 1 wt. % of water soluble material.

The tomato fibre composition of the present invention contains a significant amount of lycopene since due to its low water solubility only a fraction of this carotenoid is removed during the washing with water. Preferably, the fibre composition contains 0.01-0.3% lycopene by weight of dry matter, most preferably 0.015.0.1% lycopene by weight of dry matter.

As a result of the washing that is employed in the preparation of the tomato fibre composition the bulk of the monosaccharides is removed from the starting material. Preferably, the tomato fibre composition contains not more than 5% by weight of dry matter, more preferably not more than 3% by weight of dry matter and most preferably not more than 1% by weight of dry matter of monosaccharides selected from fructose, glucose and combinations thereof.

Pectin is a fibre component that is contained in tomato cell walls in substantial concentrations. Pectin is typically contained in the tomato fibre composition in a concentration that lies in the range of 10-40%, more preferably of 15-30% and most preferably of 15-25% by weight of dry matter.

A large fraction of the pectin contained in the present fibre composition is bound pectin. Typically, at least 70 wt. % of the pectin contained in the fibre composition is bound pectin. More preferably, at least 80 wt. % and most preferably at least 90 wt. % of the pectin in the fibre composition is bound pectin.

Cellulose is a major constituent of the insoluble tomato fibres that are contained in the tomato fibre composition. Typically, the fibre composition contains 18-45% by weight of dry matter, more preferably 25-45% by weight of dry matter and most preferably 35-45% by weight of dry matter of cellulose.

Expressed differently, the tomato fibre composition contains 20-50% cellulose by weight of water-insoluble dry matter. Even more preferably the cellulose content is 28-45% by weight of the water-insoluble dry matter, most preferably 35-45% by weight of water-insoluble dry matter.

According to a particularly preferred embodiment, the fibre composition contains less than 55%, more preferably less than 50%, even more preferably less than 46%, yet more preferably less than 43% and most preferably less than 40% pectin by weight of cellulose. Typically, the fibre composition contains at least 10%, more preferably at least 15% pectin by weight of cellulose.

The fibre composition of the present invention is further characterized by a very high content of alcohol insoluble solids. Typically, the fibre composition contains at least 65%, more preferably at least 75% and most preferably at least 80% of alcohol insoluble solids by weight of dry matter. In natural tomatoes alcohol insoluble solids typically represent only about 25-30% of the dry matter contained therein.

In tomatoes, alcohol-insoluble solids (AIS) include: protein (8%), pectic substances (7%), hemicellulose (4%), and cellulose (6%) dry matter (Davies and Hobson, *The constituents of tomato fruit—the influence of environment, nutrition and genotype*, CRC Critical Review in Food Science and Nutrition, (1981); 15(3):205-280). A suitable method for determining the AIS content is described by Hilz et al. (*Cell wall polysaccharides in black currants and bilberries—characterisation in berries, juice, and press cake*, Carbohydrate Polymers 59(4), 477-488 (2005). 2005) and involves repeated extraction with 70% aqueous ethanol (v/v) (50° C., 3 times), centrifugation in between extractions (4500 rpm, 5 min). The residue is subsequently washed with acetone prior to air-drying and weighing.

The tomato cellulose contained in the tomato fibre composition is different from wood-derived cellulose in that the tomato cellulose has a lower level of crystallinity as compared to wood derived cellulose, resp. about 32% and about 61% crystallinity. Typically, the cellulose contained in the present tomato fibre composition exhibits not more than 50%, more preferably not more than 40% and most preferably not more than 35% crystallinity. Wood-derived cellulose can also occur in the cellulose II crystal form, whereas the tomato fiber of this invention remains in the native cellulose I form. The level of crystallinity and the two crystal lattices can be distinguished with WAXS (Wide Angle X-ray Scattering).

Hemicellulose is typically contained in the tomato fibre composition in a concentration of 10-40%, more preferably of 15-35% and most preferably of 20-30% by weight of dry matter.

Fibrous polysaccharides, notably the combination of cellulose, hemicellulose and pectin, together typically constitute at least 75 wt. %, more preferably at least 85 wt. % and most preferably at least 90 wt. % of the dry matter contained in the tomato fibre composition.

The fibre composition typically contains 2-25%, more preferably 5-20% and most preferably 8-12% tomato protein by weight of dry matter.

Citric acid is another component that is naturally present in tomatoes in appreciable amounts. The present tomato fibre composition contains not more than a limited amount of citric acid as most of the citric acid is removed during washing. Typically, the composition contains 0-1.5%, preferably 0.03-0.6% and most preferably 0.05-0.4% of citric acid by weight of dry matter.

Another water-soluble component that is naturally present in tomatoes, i.e. potassium, is also largely removed during the washing step that is employed in the preparation of the tomato fibre composition. Typically, the tomato fibre composition contains 0-2%, more preferably 0.05-1.0% and most preferably 0.1-0.6% potassium by weight of dry matter.

Lipids are typically present in the tomato fibre composition in a concentration of 1-10% by weight of dry matter, more preferably of 2-8% and most preferably 4-7% by weight of dry matter.

As explained herein before, water-soluble components that are naturally present in tomatoes are largely absent from the present tomato fibre composition. As a result, the composition contains not more than a limited amount of components that are capable of increasing the electrical conductivity of demineralised water. Typically, when diluted with demineralised water to a dry matter content of 1 wt. %, the tomato fibre composition of the present invention has a conductivity of less than 200 µS/cm, more preferably less than 150 µS/cm and most preferably less than 100 µS/cm.

The present composition may contain minor quantities of components that are not tomato derived. Examples of such components include preservatives, flavouring, carrier material and combinations thereof. Preferably, at least 80 wt. %, more preferably at least 90 wt. % and most preferably 100 wt. % of the dry matter contained in the composition is derived from tomato.

In accordance with a preferred embodiment of the present invention, the tomato fibre composition contains added food acid. Addition of food acid is particularly useful in case the fibre composition has a very high water content (e.g. 88 wt. % or higher) as the microbial stability of these aqueous fibre compositions is significantly enhanced by the addition of food acid. Examples of food acids that can be employed to preserve the tomato fibre composition include citric acid, sorbic acid, benzoic acid, propionic acid and combinations thereof.

In a particularly preferred embodiment the tomato fibre composition contains added food acid in the form of citric acid. Advantageously, the tomato fibre composition contains at least 1%, more preferably 1.5-8% and most preferably 1.8-4% citric acid by weight of dry matter. The aforementioned concentration ranges include citric acid that is added to the tomato fibre composition during or after its manufacture as well as citric acid that originates from the tomato starting material and that is retained in the fibre composition.

Calculated on total fibre composition, the total citric acid content preferably is in the range of 1.0-5.0 wt. %, more preferably in the range of 1.2-1.4 wt. % and most preferably of 1.3.-3.0 wt. %.

Preservation of the tomato fibre composition by means of citric acid yields a tomato product containing an appreciable level of citric acid whilst at the same time being depleted in other organic acids that are naturally abundant in tomato, notably glutamic acid and aspartic acid. Preferably, the respective concentration levels of citric acid, glutamic acid and aspartic acid in the preserved fibre composition meet the following requirement:

$$[\text{citric acid}]/([\text{glutamic acid}]+[\text{aspartic acid}]) \geq 5;$$

wherein [citric acid]=the concentration of citric acid in the composition; [glutamic acid]=the concentration of glutamic acid in the composition; and [aspartic acid]=the concentration of aspartic acid in the composition. Even more preferably, the aforementioned ratio is at least 10. Most preferably, it is at least 15.

According to a particularly preferred embodiment, the present fibre composition is derived from processing tomatoes. Examples of processing tomatoes that may suitably be employed in the preparation of the present tomato fibre composition include Heinz cultivars H9776, 9665, 9997, 9423; Sunseeds cultivars Sun 6235, Sun 6117; Orsetti cultivars BOS 2020, BOS 3155, Grandstand 98; Petoseed cultivars Hypeel 696, Hyseed 45 and Hyseed 108; Ocha cultivars Seed OX52. Other examples include the following cultivars: Plum Crimson, Plum Daddy, Puebla, Malva and IPA6.

The tomato fibre composition of the present invention typically contains genetic material from tomato as such genetic material is preferably not removed during preparation of the fibre composition.

As explained herein before, the present fibre composition has excellent water structuring properties as is evident from the fact that following dilution with distilled water to a dry matter content of 1 wt. %, the diluted composition has a G' of at least 100 Pa at 20° C. According to a particularly preferred embodiment, the G' of the diluted composition is at least 250 Pa at 20° C. Even more preferably, the diluted composition has a G' at 20° C. of at least 400 Pa, most preferably of 500-1,000 Pa.

The shear storage modulus G' as referred to herein is determined by Rheological oscillatory measurement using a vane in cup geometry determined by the plateau value at the low strain range (0.01-0.1%) measured at 1 Hz frequency.

The inventors have observed that the tomato fibre composition offers the additional advantage that its water structuring properties are not seriously affected by variations in salt concentration. Accordingly, another preferred embodiment of the invention relates to a tomato fibre composition that, following dilution with distilled water to a dry matter content of 1 wt. %, yields a diluted composition having a G' of at least 100, more preferably at least 250 and most preferably at least 400 Pa at 20° C.; and wherein the G' of the diluted composition decreases by not more than 25% if NaCl is added in a concentration of 1 wt. %.

Yet another aspect of the invention relates to a method of manufacturing a product selected from a foodstuff, a beverage and a nutritional formulation, said method comprising incorporating into said product 1-60% by weight of the final product of a tomato fibre composition as defined herein before. More preferably, the tomato fibre composition is incorporated in the product in a concentration of 1.5-30%, most preferably of 2-20% by weight of the final product.

Expressed differently, the tomato fibre composition is advantageously incorporated in the product in a concentration of 0.1-1.5%, more preferably of 0.2-1.0% and most preferably of 0.3-0.8% by dry weight of the final product.

The water structuring properties of the tomato fibre composition are particularly appreciated when the these ingredients are incorporated in a product that contains at least 30 wt. % of water (calculated on final product). Even more preferably, the product contains at least 50 wt. % water, most preferably 80-99 wt. % water.

Examples of products in which the tomato fibre composition may suitably be used include ketchup, tomato soup, tomato based sauce, tomato paste and tomato juice.

Another aspect of the invention relates to a product obtained or obtainable by the aforementioned method.

Yet another aspect of the invention relates to a process of manufacturing a tomato fibre composition, said process comprising the successive steps of:

a) heating an aqueous composition comprising 10-100 wt. % of a tomato component selected from tomatoes, mashed tomatoes, tomato juice, tomato purée, tomato precipitate, tomato pomace, tomato skin and combinations thereof to a temperature 'T' exceeding Tmin of 70° C. during a time period T wherein temperature T (in ° C.) and the time period t (in minutes) meet the following equation: $t > 1200/(T-69)^{1.4}$; and b) washing the heated aqueous composition or a fraction of the heated aqueous composition with water to reduce the concentration of monosaccharides to less than 10% by weight of dry matter, said monosaccharides being selected from glucose, fructose and combinations thereof.

Advantageously, the aforementioned process yields a tomato fibre composition as defined herein before.

According to a particularly preferred embodiment of the present process Tmin is 75° C. Even more preferably Tmin is 80° C., especially 90° C. and most preferably 100° C.

Typically, the temperature T employed in the present process does not exceed 150° C., more preferably it does not exceed 120° C. and most preferably it does not exceed 102° C.

The heating period 't' preferably exceeds 2 minutes, more preferably 10 minutes. Most preferably, the heating period 't' is in the range of 15-60 minutes.

The aqueous composition employed in the present process typically contains 10-40% water-insoluble material by weight of dry matter. More preferably, the aqueous composition contains 15-40% and most preferably 20-40% water-insoluble material by weight of dry matter.

Expressed differently, the aqueous composition typically contains 0.5-12 wt. %, more preferably 0.7-5 wt. % and most preferably 1-2 wt. % water-insoluble material (percentage calculated on the total aqueous composition).

The aqueous composition typically contains 50-90% monosaccharides by weight of dry matter, said monosaccharides being selected from glucose, fructose and combinations thereof. More preferably said monosaccharides are contained in the aqueous composition in a concentration of 50-75%, most preferably of 50-60% by weight of dry matter.

Due to the washing of the heated aqueous composition or a fraction of the heated aqueous composition the concentration of the aforementioned monosaccharides is preferably reduced to less than 10% by weight of dry matter, more preferably less than 5% by weight of dry matter and most preferably to less than 3% by weight of dry matter of monosaccharides.

The washing step (b) of the present process advantageously employs in total at least 10 liters of water per kg of dry matter that is contained in the aqueous composition or in the fraction of the aqueous composition. Even more preferably, at least 50 liters, especially at least 150 liters and most preferably 250-1000 liters of water are employed in the washing per kg of dry matter contained in the aqueous composition or in a fraction thereof.

The aqueous composition is preferably subjected to a solid-liquid separation to produce a solid fraction and this solid fraction is subsequently washed to reduce the monosaccharide content. Examples of solid-liquid separations that may be employed include centrifugation, filtration, pressing, decanting and combinations thereof. It is noted that the solid fraction obtained from the solid-liquid separation may largely consist of water as a result of the high water binding capacity of the tomato fibres contained in said fraction.

As explained herein before, the severe heating conditions employed in the present process are critical to obtaining a tomato fibre composition having superb water structuring properties. It is particularly important that during the heating step significant swelling of the tomato cell walls is achieved. Preferably, the aqueous composition contains tomato cell walls and the average thickness of these tomato cell walls increases by at least a factor 4, more preferably by at least a factor 10 and most preferably by at least a factor 20 during the heating step (a).

In order to fully exploit the water structuring properties of the tomato fibre composition that is produced by the present process the composition should be subjected to shear at some stage of the process so that the tomato cells are broken up. Accordingly, in a preferred embodiment of the present process the heated aqueous composition is subjected to shear prior to, during or after the washing step (b) to break up cell wall fragments. Most preferably, the heated aqueous composition is subjected to shear after the washing step (b).

Preferably, the heated aqueous composition is subjected to shear by using industrial shear devices like Silverson, Turrax, high pressure homogenisation and Microfluidiser. Suitable operating conditions are specified below:
   Silverson: 4,000-8,000 rpm
   Ultra Turrax: tipspeed of 10-23 m/s
   HPH: 120-1,200 bar
   Microfluidiser: 500-2,000 bar.

As explained herein before, food acid is preferably added in case the water content of tomato fibre composition is high. Food acid is preferably added after the washing step. In case the process employs one or more solid-liquid separation steps, food acid is preferably added after the last solid-liquid separation step.

According to a particularly preferred embodiment, the food acid employed in the present process is citric acid. Citric acid is advantageously added after the washing in a concentration of at least 1%, more preferably of 1.5-8% and most preferably of 1.8-4% by weight of the dry matter contained in tomato fibre composition.

The invention is further illustrated by the following non-limiting examples.

EXAMPLES

Example 1

17.0 kg of fresh ripe vine-tomatoes, from Dutch greenhouse, were soaked in boiling water for 1 minute and then submerged in cold water for 1 minute. After removal of skins and seeds by hand 7.7 kg pericarp was obtained. 1.0 kg of this flesh was homogenized in a kitchen blender and thereafter was boiled for 95 min and cooled down to room temperature.

Subsequently, after replenishing the water lost during heating, and addition of an extra 637 ml demineralised water the tomato material was filtered on a 50 μm cheesecloth. The remaining 103 g cellular material was diluted with 820 ml demineralised water. The resulting slurry was filtered and the 380 g retentate was collected. This filtration scenario was repeated three times. The weights of the pellets obtained after filtration and the quantities of demineralised water used for dilutions are listed in Table 1.

TABLE 1

|   | Pellet weight (g) | Amount of water (g) | Cumulative washing ratio | Dry matter |
|---|---|---|---|---|
|   |   | 637 | 1.6 |   |
| 1 | 103 | 820 | 14.7 |   |
| 2 | 380 | 251 | 24.4 |   |
| 3 | 255 | 360 | 58.7 |   |
| 4 | 462 | 604 | 135.6 |   |
|   | 196 | — |   | 3.47% |

Overall yield from Tomato 0.30%, from homogenized pericarp 0.7%

The composition of the cell wall material obtained at the end of this procedure is described in Table 2.

TABLE 2

|   | Wt. % of dry matter |
|---|---|
| Dietary fibre | 82.7 |
| Cellulose | 41 |
| Pectin | 13 |
| Fructose | 0.1 |
| Glucose | 0.1 |
| Sucrose | <0.05 |
| Lycopene | 0.0018 |
| Total carotenoids | 0.007 |
| Protein | 12.8 |
| Citric acid | <0.05 |
| Fat | 0.69 |

The cellulose content was determined using the procedure described by Updegraff et al. (*Semimicro Determination of Cellulose in Biological Materials*, Analytical Biochemistry, 32, 420-424 (1969)). This procedure was downscaled to microtiter plate scale. The non-cellulosic and non-lignin material were removed from the AIS by acetic nitric acid. The remainder was subsequently treated with 67% (v/v) sulfuric acid to degrade the cellulose into glucose. These monomers were subsequently quantified with a colorimetric assay as described by Updegraff et al. (1969). Microcrystalline cellulose (20 μm) from Sigma-Aldrich was used for calibration.

The pectin content was calculated on the basis of the uronic acid content, which was determined by means of the following procedure. Firstly, samples were pre-hydrolyzed using 72% w/w sulfuric acid at 30° C. for 1 h. Subsequently the samples were further hydrolyzed with 1 M sulfuric acid at 100° C. for 3 h (Saeman et al. (1945), Hilz et al. (2006)). The uronic acid content of the hydrolyzed samples was determined using the m-hydroxydiphenyl assay (Blumenkrantz et al., 1973; Ahmed & Labavitch, 1979). The pectin content is defined as the total amount of anhydrous uronic acids.

Comparative Example A

Example 1 was repeated, except that 4.8 kg of the homogenized pericarp was not boiled for 95 minutes, but instead was heated at 80° C. for 10 minutes. The homogenized pericarp was cooled down to below room temperature and afterwards centrifuged at 4200 g for 30 minutes. The supernatant was discarded and the remaining cellular material was diluted with demineralised water. The resulting slurry was centrifuged again at 4200 g for 30 minutes and the pellet was collected. The weights of the pellets obtained after centrifugation and the quantities of demineralised water used for dilution are listed in Table 3.

TABLE 3

|   | Pellet weight (g) | Amount of water (g) | Cumulative wash ratio | Dry matter |
|---|---|---|---|---|
|   | 4,780 |   | 1.0 |   |
| 1 | 940 | 4,413 | 5.7 |   |
| 2 | 809 | — |   | 6.29% |

Overall yield from Tomato 0.54%, from homogenized pericarp 1.2%

The composition of the cell wall material obtained at the end of this procedure is described in Table 4.

TABLE 4

| | Wt. % of dry matter |
|---|---|
| Dietary fibre | 76.3 |
| Cellulose | 31 |
| Pectin | 22 |
| Fructose | 2.5 |
| Glucose | 2.5 |
| Sucrose | 0.1 |
| Lycopene | 0.015 |
| Total carotenoids | 0.047 |
| Protein | 14.1 |
| Citric acid | 0.43 |
| Fat | 1.69 |

Comparative Example B

The pellet from comparative example A was diluted with demineralised water and centrifuged again (4200 g, 30 minutes). This step was repeated. The amount of tomato material taken from the pellets obtained after centrifugation and the quantities of demineralised water used for dilution are listed in Table 5.

TABLE 5

| | Pellet weight (g) | Amount of water (g) | Cumulative wash ratio | Dry matter |
|---|---|---|---|---|
| 2 | 659 | 3,940 | 39.7 | |
| 3 | 723 | 3,000 | 205 | |
| 4 | 660 | — | | 4.08% |

Overall yield from Tomato 0.44%, from homogenized pericarp 1.0%

Example 2

The cell wall materials of the pellets of Example 1 and Comparative Examples A and B were dispersed in demineralised water to obtain a 1.7% dry matter content. Next, 500 ml of the dispersion so obtained were homogenised in a Silverson L4RT mixer at 8000 rpm using the square-hole grid. The elastic modulus (G') of the dispersed cell wall materials was determined on a TA-instruments ARG2 with cup—small vane geometry after 0, 2 and 5 minutes of Silverson treatment. The cell wall dispersions were pre-sheared for 30 sec at 100 sec−1, and left to equilibrate for 60 seconds to prevent loading effects. The G' was determined at the plateau between 0.05 and 0.5% on an oscillatory amplitude sweep at 1 Hz from 0.01% to 300% strain ($G'_{plateau}$). The results obtained are shown in Table 6

TABLE 6

| | G' [Pa] | | | |
|---|---|---|---|---|
| | 0' Silverson | 2' Silverson | 5' Silverson | Conductivity μS/cm |
| Example 1 | 1,517 | 3,042 | 2,580 | 78 (at 3.47 wt. % solids) |
| Example A | 25 | 122 | 143 | 840 (at 6.29 wt. % solids) |
| Example B | 1,103 | 696 | 576 | 58 (at 4.08 wt. % solids) |

Example 3

13.8 kg of pericarp of tomatoes was obtained from 30.0 kg fresh salad tomatoes after removal of the skins and seeds and cutting. The pericarp was heated at 110° C. for 8 minutes in a steam pressurized vessel from Pro-soya at 1.8 bar. Next, the tomato material was milled using the Pro-soya integrated mill in the vessel for 5 minutes. After filtration on a 50 micron cheese cloth 3.3 kg of retentate with a dry matter content of 6.3% was obtained.

1.5 kg of this retentate was washed further over the same cloth, under a continuous demineralised water flow of 20 liter/min. After 10 minutes the eluent was colourless and the washing was stopped. The retentate was pressed in the cloth to remove excess water and 4.5 kg of tomato insoluble fraction with a 1.8% dry matter content was obtained. The calculated wash ratio was 67 (61 from washing and 1.1 from steam addition during pressurized heating).

The elastic modulus (G') and conductivity of the tomato insoluble fraction was determined using the methodology described in Example 2. The results are depicted in Table 7

TABLE 7

| G' | 2,816 Pa |
|---|---|
| Conductivity | 20 μS/cm |

Example 4

Fresh processing tomatoes were crushed and heated at 98° C. for 30 minutes. Seeds and skins were removed with a sieve and the insoluble fraction of the resulting juice was separated with a decanter (operated at 3,000 g, residence time: 90 seconds). Next, the insoluble fraction was mixed with tap water in a weight ratio of 1:4 and another insoluble fraction was separated with the use of a decanter (operated at 3,000 g). The latter washing step was repeated once (weight ratio insoluble fraction to water of 1:4) to obtain tomato cell wall material with a 5% dry matter content.

The tomato cell wall material was found to contain 90% alcohol insoluble solids by weight of dry matter.

Example 5

The tomato cell wall material from example 4 was mixed with demineralised water in a weight ratio of 1:6 and the resulting suspension was centrifuged at 4,200 g for 45 minutes.

Example 6

The tomato material from example 5 was mixed with demineralised water in a weight ratio of 1:6 and the resulting suspension was centrifuged at 4,200 g for 45 minutes.

Example 7

The pellets obtained from Examples 5, 6 and 7 were diluted to 1.7% (w/w) dry matter content and the G' was determined after 0, 2 and 5 minutes shearing in a Silverson mixer using the methodology described in Example 2. The results are depicted in Table 8.

TABLE 8

| | G' (in Pa) | | |
|---|---|---|---|
| | 0 minutes shear | 2 minutes shear | 5 minutes shear |
| Example 5 | 95.15 | 269 | 257 |
| Example 6 | 200.3 | 864.6 | 766.8 |
| Example 7 | 256.7 | 780.2 | 663.9 |

Comparative Example C 4.1 kg pericarp from Heinz 9661 processing tomatoes was heated at 80° C. for 10 minutes and homogenised in a kitchen blender. The insoluble fraction of the homogenised tomato material was obtained after 45 minutes centrifugation at 4,200 g. The 890 g resulting pellet was resuspended in 600 ml demineralised water and centrifuged for 45 minutes at 4200 g. The washing step was repeated twice (using 500 ml demineralised water), leading to a Brix 0.7°, a conductivity of 883 μS/cm, pH 4.8 and a dry matter content of 11.8 wt. %. The calculated overall wash ratio was 5.2.

The fibre suspension so obtained was used to prepare diluted samples having a dry matter content (w/w) of 1.45% and 2.64%, respectively.

Example 8

5.4 kg of pericarp from the same batch of Heinz 9661 Processing tomatoes as used in Comparative Example C was heated at 100° C. for 10 minutes and homogenised in a kitchen blender, centrifuged and washed 2 times with demineralised water (1:4 w/w), leading to a Brix of 0.1, a conductivity of 220 μS/cm, a pH of 5.0 and a dry matter content of 4.4%. The overall wash ratio was calculated as 25.5.

The fibre suspension so obtained was used to prepare diluted samples having a dry matter content (w/w) of 1.84% and 2.71%, respectively.

Example 9

The diluted fibre suspension of Comparative Example C and Example 8 were homogenised during 2 minutes in a Silverson mixer at 8000 rpm. Before and after the homogenisation the $G'_{plateau}$ value was determined. Then 1% (w/w) of sucrose was mixed into the Silverson cell wall suspensions by manual stirring. After the sample was left at room temperature for one hour and manually stirred at the end of that period G' was measured. After the G' measurement an additional 1% sucrose was added, the sample rested for one hour and G' was determined. The results so obtained are depicted in Tables 9a and 9b.

TABLE 9a

| | | | G' (Pa) | | |
|---|---|---|---|---|---|
| Example | Dry matter | Silverson treated | 0% sucrose | 1% sucrose | 2% sucrose |
| C | 1.45% | No | 393 | 304 | 241 |
| | | Yes | 614 | 367 | 344 |
| 8 | 1.84% | No | 2,929 | 2,984 | 2,759 |
| | | Yes | 979 | 913 | 925 |

TABLE 9b

| | | | G' (Pa) | | |
|---|---|---|---|---|---|
| Example | Dry matter | Silverson treated | 0% sucrose | 1% sucrose | 2% sucrose |
| C | 2.64% | No | 3,128 | 2,056 | 2,192 |
| | | Yes | 2,590 | 1,707 | 1,431 |
| 8 | 2.71% | No | 7,185 | 6,575 | 6,476 |
| | | Yes | 2,500 | 2,323 | 2,239 |

Example 10

A 28-30° Brix hot break tomato paste was used as the starting material. This hot break paste has been extensively heat treated, not only during the 100° C. treatment of several minutes during the hot break, but also during the three stage evaporation stage where the water is evaporated to increase the solid content of the paste. 0.933 kg of the 28-30° Brix tomato paste was mixed with 7.467 kg demineralised water and centrifuged during 45 minutes at 4,200 g. The resulting pellet (763 g) was collected and resuspended in 7.4 kg demineralised water and centrifuged as above again to yield a pellet of 842 g containing 6.12% solids. Parts of this pellet were diluted with demineralised water to produce suspensions having a solids content of 3.24 wt. % and 1.58 wt. %, respectively. The diluted suspensions were homogenised with a Silverson mixer during 2 minutes at 8000 rpm.

Example 11

Part of the pellet of Example 10 (solids content of 6.12 wt. %) was diluted with demineralised water to produce a suspension with a solids content of 1.82 wt. %. This suspension was homogenized by a single pass treatment in a high pressure homogenizer at 400 bar. The Homogenized suspension so obtained was further diluted with demineralised water to a solids content of 1.38 wt. %.

Example 12

Pasta sauces were prepared on the basis of the recipes (in grams) shown in Table 10.

TABLE 10

| | A | B | C | D |
|---|---|---|---|---|
| Salt | 70 | 70 | 70 | 70 |
| Sugar | 42 | 42 | 42 | 42 |
| Spice mix | 5 | 5 | 5 | 5 |
| Water | 700 | 700 | 700 | 700 |
| Tomato puree | 4,700 | 3,800 | 2,700 | 2,700 |
| Olive oil | 140 | 140 | 140 | 140 |
| Dried onions | 42 | 42 | 42 | 42 |
| Water | 2,000 | | | |
| Suspension Example 10 (1.58%) | | 2,000 | | |
| Suspension Example 10 (3.24%) | | | 2,000 | |
| Suspension Example 11 (1.38%) | | | | 2,000 |

The pasta sauces were prepared by adding the salt, sugar and spice mix to 700 grams of water. After dissolving of the sugar and salt the aqueous mix was added to simmering tomato puree of 16.2° Brix. Next, the olive oil was added and after 2 minutes manual stirring the dried onions and 2 liter of aqueous liquid (water or suspension) were added and the mix was stirred for 5 minutes and heated and kept at 96° C. for 5 minutes before filling into glass jars.

The G', viscosity, yield stress Bostwick and Brix values of the pasta sauces after 1 day of storage were determined. The results are depicted in Table 11.

TABLE 11

| Pasta sauce | G' [Pa] | Viscosity [mPa·s] | Yield stress [Pa] | Bostwick [cm] | Brix [°] |
|---|---|---|---|---|---|
| A | 907.5 | 2823 | 19.2 | 6.6 | 13.3 |
| B | 931.5 | 3080 | 20.4 | 5.5 | 11.4 |

TABLE 11-continued

| Pasta sauce | G' [Pa] | Viscosity [mPa · s] | Yield stress [Pa] | Bostwick [cm] | Brix [°] |
|---|---|---|---|---|---|
| C | 763.0 | 2561 | 16.2 | 6.3 | 9.2 |
| D | 944.0 | 3349 | 16.5 | 5.4 | 9.2 |

The sensory quality of the pasta sauces A, B, C and D was assessed by an expert panel. In a blind test with 6 persons pasta sauce B was ranked higher than pasta sauce A with respect to taste, colour, texture. No differences were observed between pasta sauces A, C and D.

Example 13

Fresh processing tomatoes were crushed and heated at 98-100° C. for 30 minutes. Seeds and skins were removed with a sieve and the insoluble fraction of the resulting juice was separated with a decanter (operated at 3,000 g, residence time: 90 seconds). Next, the residue was diluted with water (appr. 1:5) and the diluted residue was separated with the use of a decanter (operated at 3,000 g, residence time: 90 seconds). To the residue so obtained a 50% aqueous solution of citric acid was added to reduce pH to less than 4.4, following which the product was pasteurized. The acidified tomato fibre composition so obtained had a dry matter content of approximately 5.5 wt. %.

The composition of the acidified tomato fibre composition is depicted in Table 12.

TABLE 12

|  | Wt. % of dry matter |
|---|---|
| Cellulose | 29.2 |
| Pectin | 13.9 |
| Fructose | 0.8 |
| Glucose | 0.8 |
| Lycopene | 0.026 |
| Citric acid | 2.9 |

The microbial stability of the acidified tomato fibre composition was substantially improved by the addition of citric acid.

The invention claimed is:

1. A tomato fibre composition having a dry matter content of at least 1 wt. %, wherein at least 80 wt. % of the dry matter is water-insoluble, the fibre composition comprising, by weight of dry matter:
   15-50%, cellulose;
   5-45%, pectin;
   0-10%, of monosaccharides, the monosaccharides being selected from fructose, glucose and combinations thereof;
   0.003-1%, lycopene;
   wherein the fibre composition contains less than 60% pectin by weight of cellulose; and
   wherein at least 70 wt. % of the pectin is bound pectin.

2. The composition of claim 1, wherein the composition contains less than 50% pectin by weight of cellulose.

3. The composition of claim 1, wherein the fibre composition contains 2-20% of tomato protein by weight of dry matter.

4. The composition of claim 1, wherein the composition contains 10-40% hemicellulose by weight of dry matter.

5. The composition of claim 1, wherein the composition contains 15-30% of pectin by weight of dry matter.

6. The composition of claim 1, wherein the composition contains at least 88 wt. % water.

7. The composition of claim 1, wherein the composition, following dilution with distilled water to a dry matter content of 1 wt. %, yields a diluted composition having a G' of at least 100 Pa at 20° C.

8. The composition of claim 1, wherein the composition, following dilution with distilled water to a dry matter content of 1 wt. %, has a G' of at least 100 Pa at 20° C. and wherein the G' of the diluted composition decreases by not more than 25% if NaCl is added in a concentration of 1 wt. %.

9. A method of manufacturing a product selected from a foodstuff, a beverage and a nutritional formulation, the method comprising the step of incorporating into the product 0.1-30% by weight of the final product of a tomato fibre composition according to claim 1.

10. A product obtained by a method according to claim 9.

11. A process of manufacturing a tomato fibre composition, the process consisting essentially of the successive steps of:
   a. heating an aqueous composition comprising 10-100 wt. % of a tomato component selected from the group consisting of tomatoes, mashed tomatoes, tomato juice, tomato puree, tomato paste, tomato precipitate, tomato pomace, tomato skin and combinations thereof to a temperature 'T' exceeding Tmin of 95° C. during a time period 't' wherein temperature T (in ° C.) and the time period t (in minutes) meet the following equation:

$t$ greater than $1200/(T-69)^{1.4}$ wherein the thickness of the cell walls of the heated aqueous composition increases by at least a factor 20;
   b. washing the heated aqueous composition or a fraction of the heated aqueous composition with water sufficient to reduce the concentration of monosaccharides to less than 10% by weight of dry matter, the monosaccharides being selected from glucose, fructose and combinations thereof; and
   c. subjecting the heated aqueous composition to a solid-liquid separation to produce a solid fibre fraction, washing the solid fibre fraction with water, and resuspending the washed solid fibre fraction in water.

12. The process of claim 11, wherein the aqueous composition contains 10-40% insoluble tomato fibres by weight of dry matter.

13. The process of claim 11, wherein the washing step (b) employs in total at least 10 liters of water per kg of dry matter that is contained in the aqueous composition or in the fraction of the aqueous composition.

14. The process of claim 11, wherein citric acid is added after the washing.

15. The process of claim 12, wherein the process produces a tomato fibre composition according to claim 1.

* * * * *